US008597533B2

(12) United States Patent
Kim et al.

(10) Patent No.: US 8,597,533 B2
(45) Date of Patent: Dec. 3, 2013

(54) MULTIFERROIC MATERIAL AND METHOD OF MANUFACTURING THE SAME

(75) Inventors: Kee-Hoon Kim, Seoul (KR); Yisheng Chai, Seoul (KR); Sae-Hwan Chun, Seoul (KR)

(73) Assignee: SNU R&DB Foundation, Seoul (KR)

( * ) Notice: Subject to any disclaimer, the term of this patent is extended or adjusted under 35 U.S.C. 154(b) by 297 days.

(21) Appl. No.: 12/936,901

(22) PCT Filed: Oct. 1, 2009

(86) PCT No.: PCT/KR2009/005669
§ 371 (c)(1),
(2), (4) Date: Oct. 7, 2010

(87) PCT Pub. No.: WO2010/039012
PCT Pub. Date: Apr. 8, 2010

(65) Prior Publication Data
US 2011/0031434 A1 Feb. 10, 2011

(30) Foreign Application Priority Data

Oct. 2, 2008 (KR) .................. 10-2008-0097367
Oct. 2, 2008 (KR) .................. 10-2008-0097368

(51) Int. Cl.
*C04B 35/26* (2006.01)
(52) U.S. Cl.
USPC .................................................. 252/62.58
(58) Field of Classification Search
USPC .......... 252/62.62, 62.63, 62.56, 62.57, 62.58, 252/62.59
See application file for complete search history.

(56) References Cited

U.S. PATENT DOCUMENTS

| | | | | |
|---|---|---|---|---|
| 4,355,072 A | * | 10/1982 | Mateika et al. | 428/336 |
| 5,593,612 A | * | 1/1997 | Lubitz | 252/62.56 |
| 5,858,265 A | | 1/1999 | Ataie et al. | |
| 8,228,059 B2 | * | 7/2012 | Iwasaki et al. | 324/244.1 |
| 2005/0253756 A1 | * | 11/2005 | Kuroda et al. | 343/700 MS |
| 2009/0297432 A1 | * | 12/2009 | Hill | 423/594.2 |
| 2010/0055504 A1 | * | 3/2010 | Omura | 428/840.2 |

FOREIGN PATENT DOCUMENTS

| | | | |
|---|---|---|---|
| CN | 1411008 A | | 4/2003 |
| CN | 1776834 A | | 5/2006 |
| CN | 101050108 A | | 10/2007 |
| CN | 101106001 A | * | 1/2008 |
| JP | 02-258634 A | | 10/1990 |
| WO | WO 2010107098 A1 | * | 9/2010 |

OTHER PUBLICATIONS

CN 101106001 A claims—machine translation.*
CN 101106001 A description—machine translation.*
Q. Chen, "Magnetic Properties of Aluminum-Substituted Strontium Hexaferrite Prepared by Citrate-Nitrite Sol-Gel Technique", International Journal of Modern Physics B, Nov. 6, 2006, pp. 3413-3420 vol. 22, No. 20, World Scientific Publishing Company.
International Search Report for PCT/KR2009/005669 filed Oct. 1, 2009.
P. Novak et al., "Magnetism in the magnetoelectric hexaferrite system $(Ba_{1-x}Sr_x)_2Zn_2Fe_{12}O_{22}$", Physical Review, 2007, pp. 024432-1-024432-6, The American Physical Society.
D. Mishra et al., "X-ray diffraction studies on aluminum-substituted barium hexaferrite", Science Direct, 2003, pp. 2-8, Elsevier B.V.

* cited by examiner

*Primary Examiner* — Emily Le
*Assistant Examiner* — Lynne Edmondson

(57) ABSTRACT

The present invention relates to a multiferroic material capable of freely controlling magnetic field size at room temperature, and to a method of manufacturing the same. Said multiferroic material includes hexaferrites containing magnetic iron ions partially substituted by non-magnetic ions. Said non-magnetic ions act to change the magnetic anisotropy of said hexaferrites.

34 Claims, 12 Drawing Sheets

MULTIFERROIC MATERIAL AND METHOD OF MANUFACTURING THE SAME

TECHNICAL FIELD

The present invention relates to a multiferroic material and a manufacturing method thereof. More particularly, the present invention relates to a multiferroic material that can freely control the magnitude of the applied magnetic fields to induce ferroelectric polarization and the resultant change of dielectric constant at room temperature and a manufacturing method thereof.

BACKGROUND ART

Multiferroics mean the materials that have ferroelectric and ferromagnetic properties. Studies for multiferroic materials that can control electric property with magnetic field or control the magnetic property with electrical field and their applications for devices using the multiferroic properties have been actively conducted.

However, the control of the electric polarization of the known multiferroics is so far induced by a low magnetic field at very low temperature or by very high magnetic field at room temperature. Accordingly, there is a limitation in applying the known multiferroic materials to room temperature multiferroic devices.

DISCLOSURE

Technical Problem

The present invention has been made in an effort to provide a multiferroic material that can control the magnitude of the magnetic field to induce ferroelectric polarization and the resultant change of dielectric constant. Further, the present invention has been made in an effort to provide a manufacturing method of a multiferroic material which can exhibit magnetically induced ferroelectricity and change in dielectric constant under low magnetic field at room temperature through heat treatments.

Technical Solution

An exemplary embodiment of the present invention provides a method for manufacturing a multiferroic material comprising the provided powders that selectively include barium carbonate powder, strontium carbonate powder, zinc oxide powder, iron oxide powder, aluminum oxide powder and sodium oxide powder; heat treating the powders one or more times; and providing crystallized hexaferrite by slowly cooling the powders.

A molar ratio of the barium carbonate powder, strontium carbonate powder, zinc oxide powder, iron oxide powder, aluminum oxide powder, and sodium oxide powder is $A_1(1-y')$, $A_1y'$, $A_2$, $A_3(1-x)$, $A_3 x$ and $A_4$, $A_1$, $A_2$, $A_3$ and $A_4$ are selected so that the sum of $A_1$, $A_2$, $A_3$ and $A_4$ is 100 within a range of $17 \leq A_1 \leq 22$, $17 \leq A_2 \leq 22$, $48 \leq A_3 \leq 59$ and $6 \leq A_4 \leq 8$, and y' and x are selected from the ranges of $0 \leq y' \leq 1.0$ and $0 < x \leq 0.8$.

The heat treating of the powders may include heating the powders to the first temperature, maintaining the powders at the first temperature, and cooling the powders from the first temperature to the second temperature that is smaller than the first temperature. The first temperature may be selected in the range of 1100° C. to 1500° C., and the second temperature may be selected in the range of 1000° C. to 1200° C. In the heating of the powders, a temperature increase rate may be in the range of 900° C./h to 1500° C./h. In the cooling of the powders, a temperature decrease rate may be in the range of 900° C./h to 1500° C./h. The heat treating is performed two or more times, the first temperature may be sequentially decreased or maintained as equally as that of the previous performing whenever the heat treating is performed, and the second temperature may be sequentially increased or maintained as equally as that of the previous performing whenever the heat treating is performed.

The heat treating may be performed two or more times, the maintaining may be performed for 10 to 30 hours during the period of performing the first heat treating, and the maintaining may be performed for 0 to 5 hours during the period of performing the next heat treating. In the providing of crystallized hexaferrite, the temperature decrease rate may be in the range of 0.1° C./h to 100° C./h. The providing of crystallized hexaferrite may include first slowly cooling process which is performed at a speed of 0.1° C./h to 10° C./h, and second slowly cooling process which is performed at a speed of 50° C./h to 100° C./h.

The method may further comprise heating the hexaferrite to the heat treatment temperature at a first rate, maintaining the hexaferrite at the heat treatment temperature, and cooling the hexaferrite that is maintained at the heat treatment temperature at a second rate. In the heating of hexaferrite, the first rate may be in the range of 10° C./h to 1500° C./h. The first rate may be substantially 220° C./h. In the heating of hexaferrite, the heat treatment temperature may be in the range of 800 to 950° C. The heat treatment temperature may be substantially 900° C.

In the cooling process of hexaferrite, the second rate may be in the range of 10° C./h to 100° C./h. The second rate may be substantially 50° C./h. The heating, the maintaining, and the cooling processes may be implemented under an oxygen atmosphere. The oxygen pressure under an oxygen atmosphere may be in the range of 0.5 to 500 atm. The oxygen pressure under an oxygen atmosphere may be substantially 1 atm.

In the heating process of hexaferrite, the hexaferrite is a Y type, has a formula of $A_2B_2(Fe_{1-x}Al_x)_{12}O_{22}$ ($0 \leq x \leq 0.8$) or a formula of $A_2B_2Fe_{12}O_{22}$, an A element is one or more of barium (Ba) and strontium (Sr), and a B element is any one of zinc (Zn), cobalt (Co) and magnesium (Mg). The hexaferrite may have a formula of $(Ba_{1-y}Sr_y)_2Zn_2(Fe_{1-x}Al_x)_{12}O_{22}$ ($0 \leq y \leq 1.0$, $0 \leq x \leq 0.8$).

A ratio between the resistivity of hexaferrite, which is obtained after the cooling of hexaferrite to the resistivity of hexaferrite that is obtained after the providing of crystallized hexaferrite may be in the range of 10 to $10^6$. The resistivity of hexaferrite, which is obtained after the cooling of hexaferrite, is in the range of $10^4$ Ω·cm to $10^7$ Ω·cm.

A change in dielectric constant of the hexaferrite by applied magnetic fields, which is obtained after the cooling of hexaferrite, may be in the range of 0 to 20% at a temperature that is in the range of 260 to 400 K in a magnetic field that is in the range of 0 to 0.1 T. An electric polarization of the hexaferrite that is obtained after the cooling of hexaferrite may occur at a temperature that is in the range of 260 to 400 K under a magnetic field that is in the range of 0 to 0.1 T.

Another exemplary embodiment of the present invention provides a multiferroic material comprising hexaferrite in which a magnetic iron ion is partially substituted by a nonmagnetic ion. The nonmagnetic ion is applied so as to change the magnetic anisotropic property of hexaferrite.

The nonmagnetic ion may be aluminum ion. A substitution ratio of the nonmagnetic ion to the iron ion may vary from 0 to 80%.

Electric polarization of hexaferrite may occur in a magnetic field that is in the range of 0 to 10 mT. As the substitution amount of the nonmagnetic ion is increased, the intensity of the magnetic field that causes electric polarization of hexaferrite sequentially may approach 0. A change in dielectric constant of hexaferrite may be in the range of 0 to 20% under applied magnetic fields that is in the range of 0 to 10 mT. As the substitution amount of the nonmagnetic ion is increased, the magnitude of a magnetic field that causes the change in the dielectric constant of hexaferrite may sequentially approach 0.

The hexaferrite may be a Y type, may have a formula of $A_2B_2(Fe_{1-x}Al_x)_{12}O_{22}$ (0<x≤0.8), an A element may be one or more of barium (Ba) and strontium (Sr), and a B element may be any one of zinc (Zn), cobalt (Co) and magnesium (Mg). The hexaferrite may have a formula of $(Ba_{1-y}Sr_y)_2Zn_2(Fe_{1-x}Al_x)_{12}O_{22}$ (0≤y≤1.0, 0<x≤0.8). Specific resistance of hexaferrite may be in the range of $10^4$ Ω·cm to $10^7$ Ω·cm.

Advantageous Effects

The magnitude of the magnetic field that induces electric polarization may be sequentially lowered to around 0 mT and the magnitude of the electric polarization may be controlled by substituting a predetermined amount of iron ion with a nonmagnetic ion such as aluminum ion. Therefore, the multiferroic material may be easily used in memory devices using an electric polarization-magnetic field hysteresis curve.

In addition, when the magnetic field is applied, the dielectric constant may be changed from minimum several % to maximum 20% by substituting a predetermined amount of iron ion with a nonmagnetic ion such as aluminum ion. In addition, the magnitude of the magnetic field that is required to change the dielectric constant may be systematically lowered to around 0 mT in proportion to the doping level of the aluminum ion. In addition, since the range of the magnetic field at which the change of dielectric constant is at the maximum may be controlled by the substitution amount of the nonmagnetic ion, the multiferroic material may be usefully used in the magnetic field sensor applications. In addition, by controlling the value of the magnetic field that induces the change of dielectric constant, the multiferroic material may be used instead of electronic materials that are applied to a microwave circulator, phase shifter, filter and the like among microwave electronic devices using hexaferrite.

By increasing the resistivity of hexaferrite through the heat treatment, a multiferroic material that exhibits the multiferroic property under a low magnetic field at room temperature may be manufactured. The multiferroic material may exhibit the changes in i) the dielectric constant and ii) ferroelectric property by forming electric polarization at room temperature by a low magnetic field of around 0.

MODE FOR INVENTION

Figure 1:
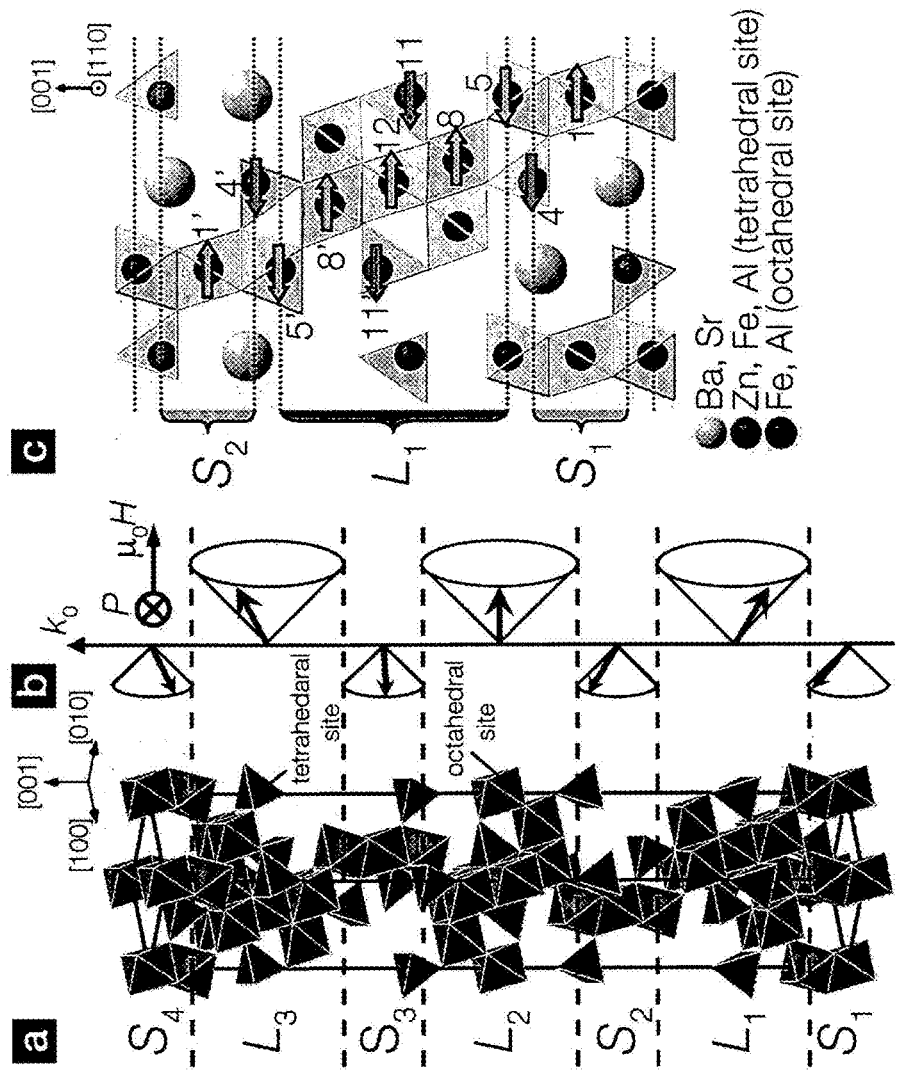
FIG. 1 is a schematic view that illustrates a crystal structure of a Y type hexaferrite and magnetic spin arrangement according to the first exemplary embodiment of the present invention.

Hereinafter, the present invention will be described more fully hereinafter with reference to the accompanying drawings, in which exemplary embodiments of the invention are shown. The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described. Like reference numerals refer to like elements throughout the specification.

All terminologies that include technical terminologies and scientific terminologies used herein have the same meaning as that understood by those who are skilled in the art to which the present invention belongs. The terminologies that are defined previously are further understood to have the meaning that coincides with the contents that are disclosed in relating technical documents, but not as the ideal or very official meaning unless it is not defined.

Terms such as first, second, and third are used to illustrate various portions, components, regions, layers and/or sections, but not limit them. These terms are used to discriminate the portions, components, regions, layers or sections from the other portions, components, regions, layers or sections. Therefore, the first portion, component, region, layer or section as described below may be the second portion, component, region, layer or section within the scope of the present invention.

It is to be understood that the terminology used therein is for the purpose of describing particular embodiments only and is not intended to be limiting. It must be noted that, as used in the specification and the appended claims, the singular forms include plural references unless the context clearly dictates otherwise. It will be further understood that the terms "comprises" and/or "comprising," when used in this specification, specify the presence of stated properties, regions, integers, steps, operations, elements, and/or components, but do not preclude the presence or addition of one or more other properties, regions, integers, steps, operations, elements, and/or components thereof.

Multiferroic Material According to the First Exemplary Embodiment of the Present Invention The multiferroic material according to the first exemplary embodiment includes a Y type single crystal hexaferrite in which the magnetic iron ion ($Fe^{3+}$) is partially substituted by a nonmagnetic ion. The nonmagnetic ion may be substituted for i) iron ion, and ii) should meet the condition that will change the magnetic anisotropic property of hexaferrite, and aluminum ion ($Al^{3+}$) may be used as an example of the nonmagnetic ion.

The nonmagnetic ion changes the magnetic anisotropic property of hexaferrite by substituting the iron ion. Accordingly, as the substitution amount of the nonmagnetic ion is increased in hexaferrite, with a lower magnetic field, i) the electric polarization in hexaferrite may be induced and the change of dielectric constant in hexaferrite may occur from minimum several % to maximum about 20%. For example, the change of dielectric constant in the range of about 0.1% to about 20% may occur.

In a case where the substitution ratio is about 0%, when the iron ion is not substituted by the nonmagnetic ion, electric polarization does not occur and several % of the dielectric constant change does not occur in the above small magnetic field. Meanwhile, in a case where the substitution ratio of the nonmagnetic ion to the iron ion is more than about 80%, the intensity of electric polarization may become smaller or the change of the dielectric constant to the magnetic field may become nonuniform. Accordingly, a substitution ratio of the nonmagnetic ion to the iron ion may be more than about 0 to about 80% or less. It is preferable that it may be more than about 0 to about 12% or less. In addition, i) the intensity of electric polarization may be increased and ii) the range of the magnetic field at which the change of the dielectric constant is at the maximum may be controlled by changing the substitution ratio of the nonmagnetic ion to the iron ion.

More particularly, in a case where the substitution ratio relating to electric polarization is increased, until the substitution ratio is about 80%, the magnitude of electric polarization is increased, and becomes nouniform or is lowered. In addition, in a case where the substitution ratio relating to the dielectric constant change is increased in the range of about 0 to about 80%, the range of the magnetic field at which the change of dielectric constant is at the maximum is sequentially moved from about 1 T to almost 0.

Hexaferrite has the following Formula 1. Herein, an A element may be one or more of barium (Ba) and strontium (Sr), and a B element may be any one of zinc (Zn), cobalt (Co) and magnesium (Mg).

$A_2B_2(Fe_{1-x}Al_x)_{12}O_{22}(0<x\leq0.8)$ [Formula 1]

As described above, the substitution ratio of the aluminum ion that is the nonmagnetic ion to the iron ion is in the range of about 0 to about 80%, which is represented by $0<x\leq0.8$ in Formula 1. The A element, B element, iron, aluminum and oxygen form a rhombohedral crystal structure. For example, more particularly, hexaferrite may be represented by the following Formula 2.

[Formula 2]

$(Ba_{1-y}Sr_y)_2Zn_2(Fe_{1-x}Al_x)_{12}O_{22}(0\leq y\leq1.0, 0<x\leq0.8)$

Herein, the range of y that shows the content relationship of barium and strontium is $0\leq y\leq1.0$, and the range of x that shows the content relationship of iron and aluminum is $0<x\leq0.8$. Within the above range, barium and strontium in conjunction with the other elements that construct a rhombohedral structure and cause the change of electric polarization and dielectric constant in the magnetic field applied may be substituted with each other.

Change of Magnetic Property by the Aluminum Ion

FIG. 1 is a schematic view that illustrates a crystal structure of a Y type hexaferrite and magnetic spin arrangement according to the first exemplary embodiment of the present invention. Herein, the Y type hexaferrite has the following Formula 3.

$(Ba_{0.25}Sr_{0.75})_2Zn_2(Fe_{1-x}Al_x)_{12}O_{22}(0<x\leq0.8)$ [Formula 3]

Referring to portion "a" of FIG. 1, the Y type hexaferrite forms a layered structure and may be magnetically classified into an S-block and an L-block. Portion b of FIG. 1 shows a form of magnetic spin arrangement when a magnetic field is applied perpendicular to the crystallographic c axis of the single crystal of hexaferrite. In addition, portion c of FIG. 1 shows a ½ unit cell from [110] crystallographic direction. The sphere that corresponds to Fe and Al and the sphere that corresponds to Zn, Fe and Al represent respectively ions that are disposed at the center of the octahedron and the center of the tetrahedron. The magnetic and electric properties of the Y type hexaferrite are determined by super exchange interaction between iron ions ($Fe^{3+}$) that are disposed at the centers of the octahedron and tetrahedron.

The aluminum ion ($Al^{3+}$) mostly substitutes for the iron ion ($Fe^{3+}$) that is disposed at the center of the octahedron. In this case, by substituting the iron ion ($Fe^{3+}$) that has the magnetic property by the aluminum ion ($Al^{3+}$) that has no magnetic property, a change occurs in super exchange interaction between the iron ions ($Fe^{3+}$) that determine the magnetic and electric properties. The arrow in portion c of FIG. 1 represents, in the case of the single crystal that has the formula of $Ba_2Zn_2Fe_{12}O_{22}$, the magnetic spin direction that is determined by the super exchange interaction between the iron ions ($Fe^{3+}$).

Each magnetic spin arrangement is determined by the super exchange interaction between adjacent Fe—O—Fe. In general, the magnetic spin that is disposed in the S-block and the L-block is arranged in a reverse direction to the adjacent other spins. However, Fe(4) and Fe(5) that are disposed at the boundary of the S-block and the L-block are arranged in the same direction. This is because the super exchange interaction of Fe(4)-O(2)-Fe(5) is relatively weak as compared to the super exchange interaction of Fe(4)-O(6)-Fe(8) and the super exchange interaction of Fe(5)-0(7)-Fe(8). Herein, the number in the bracket represents the order of the layered structure that is formed by elements. The intensity of the Fe—O—Fe super exchange interaction around the boundary between the S-block and the L-block is shown in the following Table 1.

TABLE 1

| | Super exchange interaction between iron ions ($Fe^{3+}$) | | |
| --- | --- | --- | --- |
| | Fe(5)—O(7)—Fe(8) | Fe(4)—O(6)—Fe(8) | Fe(4)—O(2)—Fe(5) |
| Strength | Strong | Medium | Weak |

Meanwhile, in the case of the compound that has the following Formula 4 in which the barium ion ($Ba^{2+}$) is substituted by the strontium ion ($Sr^{2+}$), the arrangement of the magnetic spins is different from the case of y=0.

In this case, the spins in the S-block and the L-block are arranged in parallel along the direction. However, an effective magnetic moment that is obtained by summing all of the spins in the S-block, the effective magnetic moment of L-block, and the magnetic spin of Fe(5) that is disposed at the boundary of the two blocks rotate on the basis of the c axis.

$$(Ba_{1-y}Sr_y)_2Zn_2Fe_{12}O_{22} (0 \leq y \leq 1.0) \quad \text{[Formula 4]}$$

The compound that has the following Formula 5 in which the iron ion ($Fe^{3+}$) is substituted by the aluminum ion ($Al^{3+}$) has a similar magnetic arrangement to Formula 4. However, the aluminum ion ($Al^{3+}$) selectively substitutes for the iron ion ($Fe^{3+}$) that is disposed at the center of the octahedron rather than the iron ion ($Fe^{3+}$) that is disposed at the center of the tetrahedron, thus lowering the magnetic anisotropic property.

$$(Ba_{1-y}Sr_y)_2Zn_2(Fe_{1-x}Al_x)_{12}O_{22} (0 \leq y \leq 1.0, 0 < x \leq 0.8) \quad \text{[Formula 5]}$$

Since the magnetic anisotropic property is lowered according to the substitution of the aluminum ion ($Al^{3+}$), it is possible to control the arrangement form of the magnetic spins in the small magnetic field. As a result, as shown in the portion b of FIG. 1, the magnetic spin arrangement is easily implemented.

Control of Magnetoelectric Property According to Aluminum Doping

The magnetoelectric property of the material in which electric polarization is induced by applying magnetic field is described as the spin current model. Herein, electric polarization that is induced by the magnetic spin arrangement satisfies the following relation equation.

$$\vec{P} \propto \vec{k_0} \times (\vec{\mu_s} \times \vec{\mu_L})$$

Herein, $\vec{k_0}$ is a vector that means a direction and cycle of repetition of the magnetic arrangement spin, $\vec{\mu_s}$ is an effective magnetic moment of S-block, $\vec{\mu_L}$ is an effective magnetic moment of the L-block.

In a case where the magnetic field is applied to the compound that has the above Formula 6 in a direction perpendicular to the c axis, the magnetic arrangement occurs like portion b of FIG. 1 and magnetic polarization may be induced. In particular, as the amount of aluminum is increased, the above magnetic arrangement is gradually feasible in a lower magnetic field. This means that electric polarization is gradually induced in a lower magnetic field. In addition, since the magnetic spins may rotate in a larger angle along the c axis according to the aluminum doping, electric polarization value is increased. That happens when, in the spin current model,

is increased. In addition, the change of the dielectric constant that is generated when electric polarization is induced is gradually moved to a lower magnetic field.

Test Relating to the Magnetic Moment, Relative Change of Dielectric Constant and Electric Polarization According to the Substitution Amount of Aluminum By using hexaferrite that has the formula of $Ba_{0.5}Sr_{1.5}Zn_2(Fe_{1-x}Al_x)_{12}O_{22}$, the magnetic moment M, the relative change of dielectric constant,

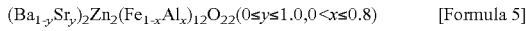

and the change of electric polarization P with an applied magnetic field at a temperature of about 30 K were measured. Herein, the substitution amount x of aluminum was each 0.02, 0.04, 0.06 and 0.08.

Figure 2:
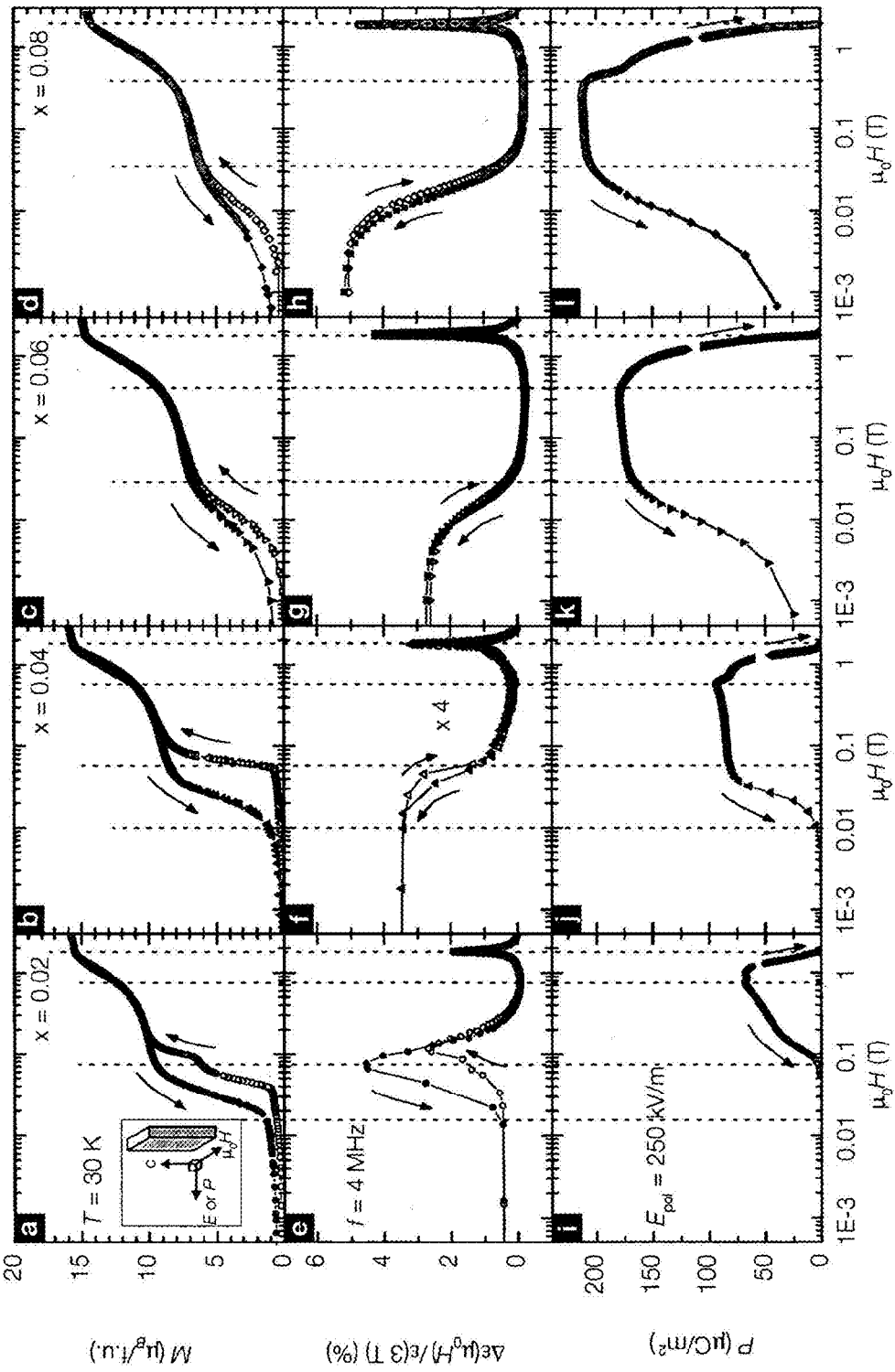
FIG. 2 is a graph that illustrates the test results of a magnetic moment, relative changes of dielectric constant and electric polarization under magnetic field according to the substitution amount of aluminum.

FIG. 2 is a graph that illustrates the test results of a magnetic moment, relative change of dielectric constant and electric polarization under magnetic field according to the substitution amount of aluminum.

In detail, the portions a, b, c and d of FIG. 2 represent the magnetic moments M under the applied magnetic field when the substitution amount x of aluminum is each 0.02, 0.04, 0.06 and 0.08, and the portions e, f, g and h of FIG. 2 represent the relative change of dielectric constant ($\Delta \in (\mu_o H) / \in (3T)$) with the applied magnetic field when the substitution amount x of aluminum is each 0.02, 0.04, 0.06 and 0.08, and portions i, j, k and l of FIG. 2 represent electric polarization P induced by the applied magnetic field when the substitution amount x of aluminum is each 0.02, 0.04, 0.06 and 0.08.

As shown in FIG. 2, as the substitution amount x of aluminum is increased, it can be seen that relative change in the dielectric constant and electric polarization is induced by the magnetic field of around 0. In addition, in a case where the substitution amount x of aluminum is 0.06 and 0.08, it can be seen that the magnitude of electric polarization is increased.

More particularly, in the relatively small magnetic field of about 10 mT, electric polarization appears, and in a case where the substitution amount of aluminum is increased, it can be seen that the magnitude of the magnetic field that can induce electric polarization sequentially approaches 0. In addition, in the magnetic field of 10 mT or less, the dielectric constant changes in the range of minimum several % to maximum about 20% occurs, and as the substitution amount of aluminum is increased, the value of the magnetic field that causes the change of dielectric constant sequentially approaches 0.

Test Relating to the Ferroelectric Phase Transition of the Multiferroic Material According to the Substitution Amount of Aluminum In hexaferrite, which has the formula of $Ba_{0.5}Sr_{1.5}Zn_2(Fe_{1-x}Al_x)_{12}O_{22}$, while the substitution amount x is changed to 0.00, 0.01, 0.02, 0.03, 0.04, 0.06 and 0.08, ferroelectric phase transition was observed.

Figure 3:
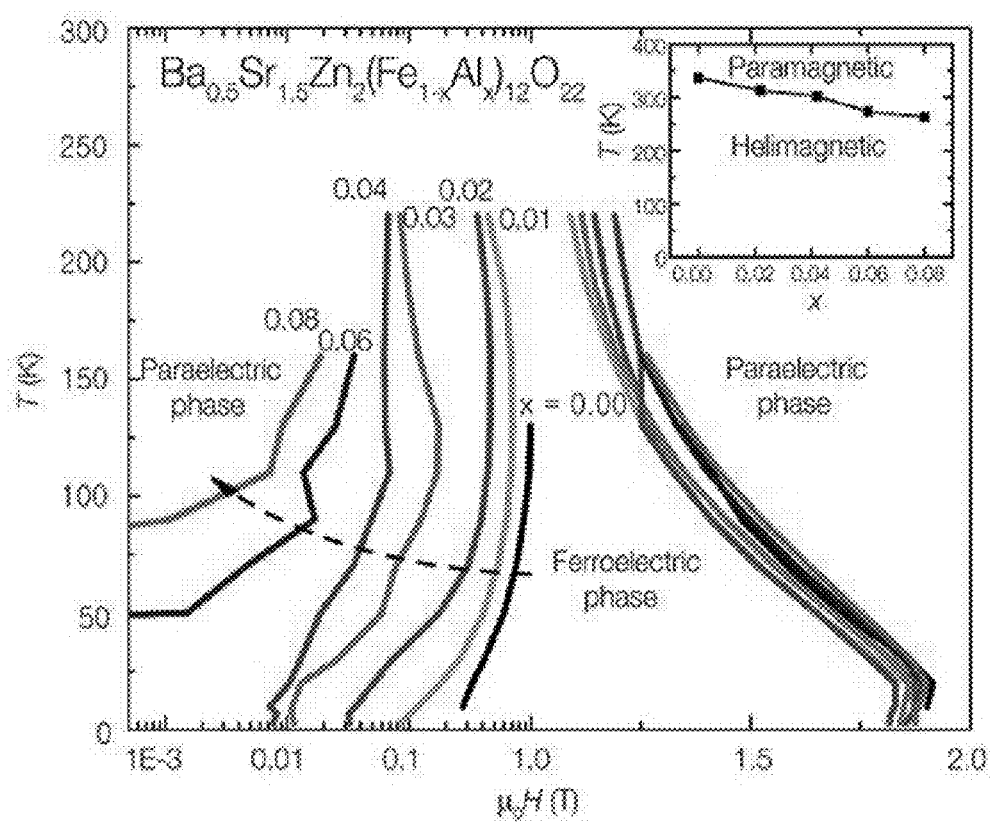
FIG. 3 is a phase diagram that illustrates the test results of the phase boundaries between ferroelectric and paraelectric states according to the substitution amount of aluminum.

FIG. 3 is a phase diagram that illustrates the phase boundary test results of a transition between ferroelectric and paraelectric states according to the substitution amount of aluminum.

As shown in FIG. 3, as the substitution amount of aluminum is increased, the phase boundary line of the phase transition from ferroelectric to paraelectric state is gradually shifted to the lower magnetic field. In addition, the helical magnetic ordering temperature at which the ferroelectric phase can exist is decreased as the substitution amount is increased.

Figure 4:
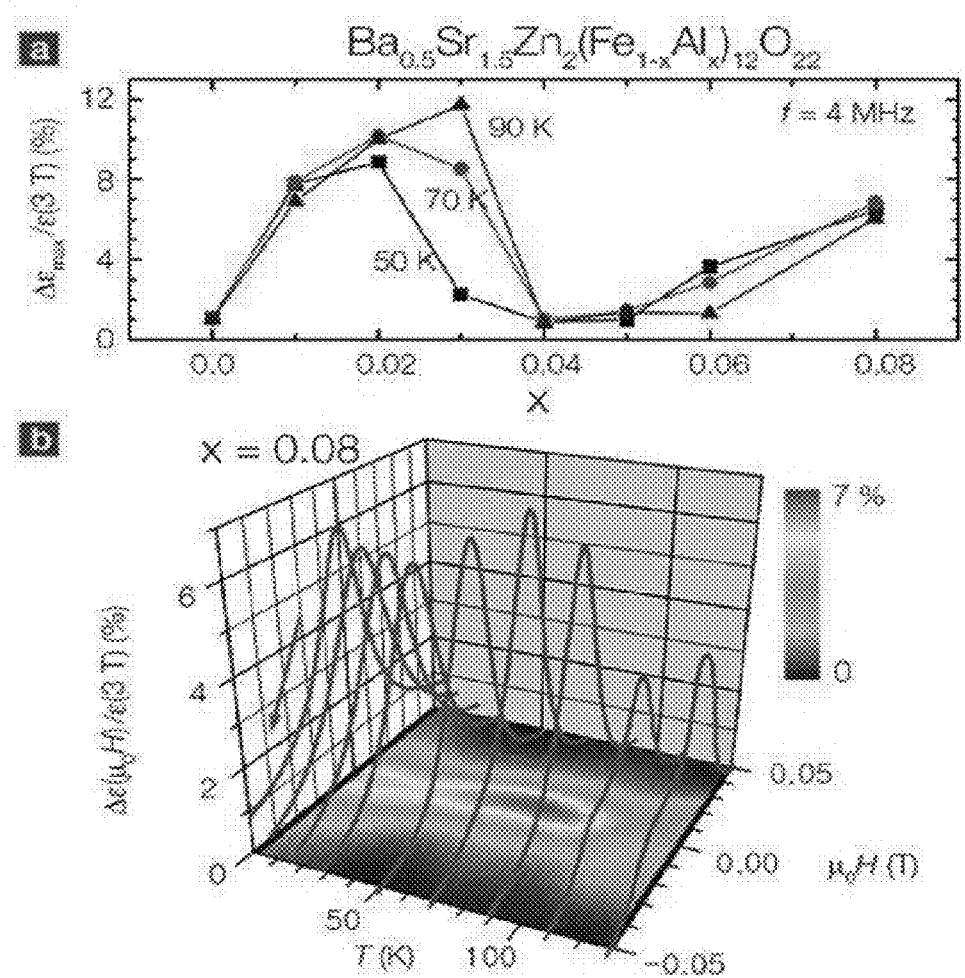
FIG. 4 is a graph that illustrates the test results of the magnetic field induced change of the dielectric constant according to the substitution amount of aluminum.

Test Relating to the Magnetic Field Induction Dielectric Constant According to the Substitution Amount of Aluminum In hexaferrite, which has the formula of $Ba_{0.5}Sr_{1.5}Zn_2(Fe_{1-x}Al_x)_{12}O_{22}$, while the substitution amount x of aluminum is changed to 0.00, 0.01, 0.02, 0.03, 0.04, 0.06 and 0.08, the maximum relative change of dielectric constant was measured under magnetic field under a predetermined temperature condition FIG. 4 is a graph that illustrates the test results of the magnetic field induced dielectric constant change in different substitution amount of aluminum. In portion a of FIG. 4, when the substitution amount x of aluminum is increased to 0.00, 0.01, 0.02, 0.03, 0.04, 0.06 and 0.08 at the temperature condition of 50 K, 70 K, and 90 K, the magnetic field induced dielectric constant change is illustrated, and in portion b of FIG. 4, when the substitution amount x of aluminum is 0.08, the magnetic field induced dielectric constant as a function of the magnetic field of around 0 and the temperature is three dimensionally illustrated.

As shown in FIG. 4, the dielectric constant may be changed from minimum several % to maximum 20% in a small magnetic field of around 0 by substituting a predetermined amount of aluminum. More particularly, the change of the dielectric constant occurs in the range of minimum several % to maximum about 20% in a magnetic field of about 10 mT or less.

Figure 5:
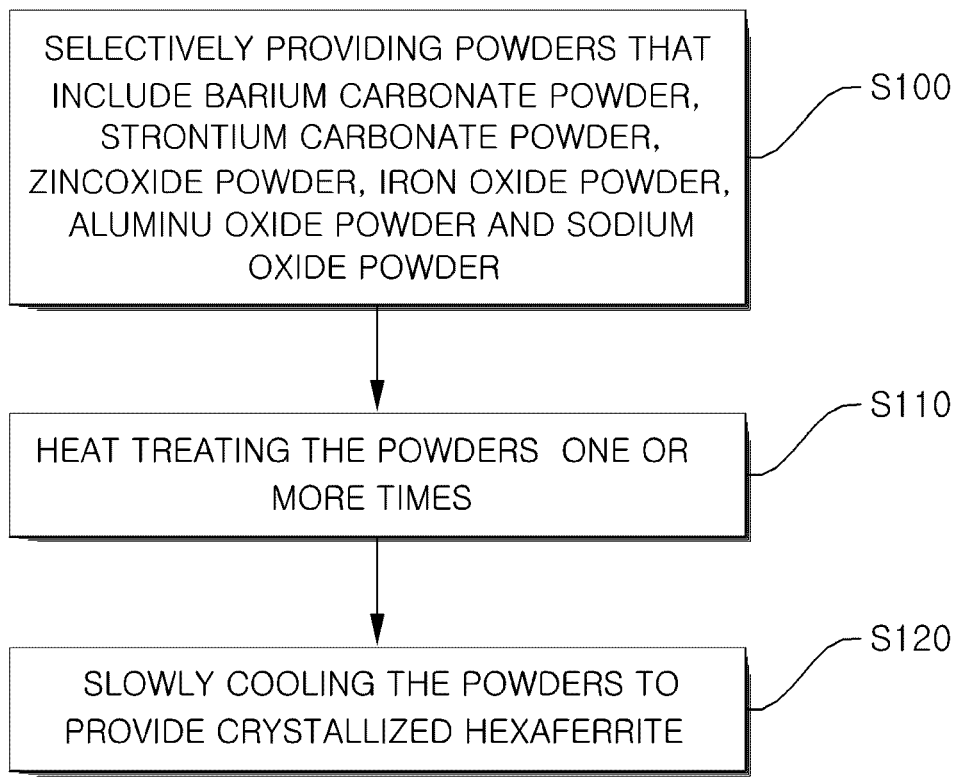
FIG. 5 is a flowchart that schematically illustrates a manufacturing method of the multiferroic material according to the first exemplary embodiment of the present invention.

Manufacturing Method of the Multiferroic Material According to the First Exemplary Embodiment of the Present Invention FIG. 5 is a flowchart that schematically illustrates a manufacturing method of the multiferroic material according to the first exemplary embodiment of the present invention.

As shown in FIG. 5, a method for manufacturing a multiferroic material according to the exemplary embodiment of the present invention includes i) providing powders that selectively include barium carbonate powder, strontium carbonate powder, zinc oxide powder, iron oxide powder, aluminum oxide powder and sodium oxide powder (S100); ii) heat treating the powders one or more times (S110); and iii) providing crystallized hexaferrite by slowly cooling the powders (S120). In addition to this, the manufacturing method of the multiferroic material may further include other steps.

As shown in FIG. 5, in step S100, the powders that selectively include barium carbonate ($BaCO_3$) powder, strontium carbonate ($SrCO_3$) powder, zinc oxide (ZnO) powder, iron oxide ($Fe_2O_3$) powder, aluminum oxide ($Al_2O_3$) powder and sodium oxide ($Na_2O$) powder are provided. Herein, since the above powders may be selectively provided, a portion of the above powders may be excluded. For example, any one powder of barium carbonate ($BaCO_3$) powder and strontium carbonate ($SrCO_3$) powder may not be provided, or the aluminum oxide ($Al_2O_3$) powder may not be provided. Meanwhile, the sodium oxide ($Na_2O$) powder may be provided in order to lower the manufacturing temperature of the hexaferrite material. The following Table 2 represents a molar ratio of the powders required in step S100.

TABLE 2

| NO | Powder name | Molar ratio |
|---|---|---|
| 1 | Barium carbonate | $A_1(1 - y')$ |
| 2 | Strontium carbonate | $A_1 y'$ |

TABLE 2-continued

| NO | Powder name | Molar ratio |
|---|---|---|
| 3 | Zinc oxide | $A_2$ |
| 4 | Iron oxide | $A_3(1 - x)$ |
| 5 | Aluminum oxide | $A_3 x$ |
| 6 | Sodium oxide | $A_4$ |

As described in Table 2, the molar ratios of barium carbonate, strontium carbonate, zinc oxide, iron oxide, aluminum oxide and sodium oxide are respectively $A_1(1-y')$, $A_1 y'$, $A_2$, $A_3(1-x)$, $A_3 x$ and $A_4$. Herein, $A_1, A_2, A_3$ and $A_4$ are included respectively in the range of $17 \leq A_1 \leq 22$, $17 \leq A_2 \leq 22$, $48 \leq A_3 \leq 59$ and $6 \leq A_4 \leq 8$, and selected so as to satisfy that the sum thereof is 100. In addition, y' and x are selected in the range of $0 \leq y' \leq 1.0$ and $0 < x \leq 0.8$.

The nominal molar ratio is required in order to finally obtain the Y type single crystal hexaferrite having the above Formula 2 in consideration of components that are removed by impurities such as $ZnFe_2O_4$. Herein, the temperature of the powders may be in the range of about 260 K to about 400 K, but is not limited thereto, and is enough as long as the solid powder state can be maintained.

For example, the temperature of the powders may be at about 298 K, that is, 25° C.

In step S110, the powders are treated one or more times by heat. More particularly, the heat treating is performed by putting the powders into a platinum crucible and placing platinum crucible in a furnace. In this case, the heat treating step is subdivided, and may include i) heating to the first temperature, ii) maintaining the first temperature, and iii) cooling to the second temperature that is lower than the first temperature.

Herein, in a case where the first temperature is less than about 1100° C., it is difficult to form the melting state of the powders. On the other hand, in a case where the first temperature is more than about 1500° C., the first temperature is too high to control, so that the impurities may be melted and contained in the powders. Accordingly, the first temperature may be about 1100° C. to about 1500° C.

In addition, in a case where the second temperature is less than about 1000° C., excessive energy is required in heating the powders to the first temperature, so that the yield declines. On the other hand, in a case where the second temperature is more than about 1200° C., it is difficult to remove impurities such as $ZnFe_2O_4$. Accordingly, the second temperature may be in the range of about 1000° C. to about 1200° C. less than the first temperature.

In the heating to the first temperature, in a case where a temperature increase rate is less than about 900° C./h, since a time to reach the first temperature is lengthened, a production yield of hexaferrite is lowered. On the other hand, in a case where the temperature increase rate is more than about 1500° C./h, since a heating time is relatively short, it is not easy to control the temperature. Accordingly, in the heating to the first temperature, a temperature increase rate may be in the range of about 900° C./h to 1500° C./h.

In the cooling to the second temperature that is lower than the first temperature, in a case where the temperature decrease rate is less than about 900° C./h, since a time to reach the second temperature is prolonged, a production yield is lowered. On the other hand, in a case where the temperature decrease rate is more than about 1500° C./h, since a cooling time is relatively short, it is not easy to control the temperature. Accordingly, in the cooling to the second temperature that is lower than the first temperature, the temperature decrease rate may be about 900° C./h to about 1500° C./h.

As described above, the heat treating that includes i) heating to the first temperature, ii) maintaining the first temperature, and iii) cooling to the second temperature that is lower than the first temperature may be repetitively performed in order to effectively remove impurities such as $ZnFe_2O_4$.

Figure 6:
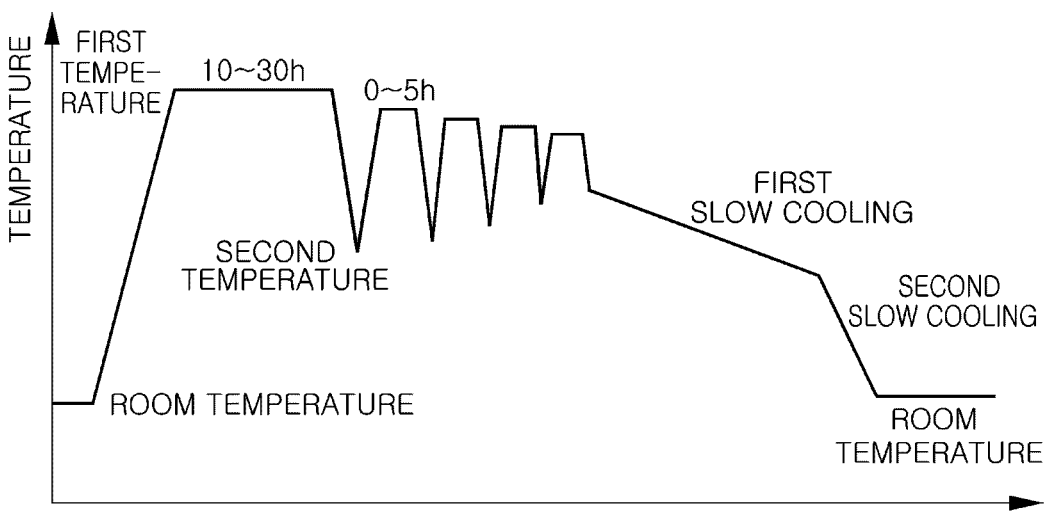
FIG. 6 is a graph that schematically illustrates the repetitive performing of heat treating in FIG. 5.

FIG. 6 is a graph that schematically illustrates repetitive performing of a heat treating of FIG. 5.

As shown in FIG. 6, the impurity removal efficiency is increased and the yield of hexaferrite is improved by gradually decreasing the first temperature or maintaining the first temperature in the same manner as the previous performing whenever the heat treating is performed. In addition, the second temperature may be sequentially increased or maintained in the same manner as the previous performing whenever the heat treating is performed.

In a case where the maintaining time at the first temperature is less than about 10 hours in the initial heat treating, since solid powders are not sufficiently changed to a liquid phase, it may remain in a solid phase. On the other hand, in a case where the maintaining time at the first temperature is more than about 30 hours in the initial heat treating, even though the change in the powders to the liquid phase is completed, unnecessary energy may be consumed because of heating. Accordingly, when the initial heat treating is performed, the maintaining time at the first temperature may be about 10 hours to about 30 hours. When the next heat treating is performed, the maintaining time at the first temperature is about 5 hours or less and preferably about 0.05 to about 5 hours, which is less than the initial maintaining time at the first temperature. This is because small energy is required as compared to when the solid phase is changed into the liquid state at an initial step.

Referring to FIG. 5 again, in step S120, crystallized hexaferrite is provided by slowly cooling the powders. In a case where the temperature decrease rate is less than about 0.1° C./h in the slowly cooling, since the temperature decrease rate is relatively low, a production yield may be lowered. On the other hand, in a case where the temperature decrease rate is more than about 100° C./h, the hexaferrite does not form single crystals. Therefore, when slow cooling is performed, the temperature decrease rate may be about 0.1° C. to about 100° C./h.

In addition, the slow cooling process may include first slowly cooling that is performed at 0.1° C./h to 10° C./h, and second slowly cooling that is performed at 10° C./h to 100° C./h. In a case where the second slow cooling is performed at the temperature decrease rate in the range of about 10° C./h to about 100° C./h, which is relatively larger than that of the first slow cooling after the first slow cooling is performed at the temperature decrease rate in the range of about 0.1° C./h to about 10° C./h, which is capable of stably forming the single crystal, the manufacturing time can be shortened.

Herein, the temperature of the multiferroic material that is finally cooled may be a room temperature in the range of about 260 K to about 400 K, but is not limited thereto, and is enough as long as the multiferroic material can be maintained in a solid phase. For example, the temperature of the multiferroic material may be slowly cooled to about 298 K, that is, 25° C.

Manufacturing Test of the Multiferroic Material According to the First Exemplary Embodiment of the Present Invention In the preparing the powders of barium carbonate, strontium carbonate, zinc oxide, iron oxide, aluminum oxide and sodium oxide in which the molar ratio is $A_1(1-y')$, $A_1y'$, $A_2$, $A_3(1-x)$, $A_3x$, $A_4$, $A_1$, $A_2$, $A_3$ and $A_4$ are selected as 19.69, 19.69, 53.61 and 7.01, respectively, in the range of $17 \leq A_1 \leq 22$, $17 \leq A_2 \leq 22$, $48 \leq A_3 \leq 59$ and $6 \leq A_4 \leq 8$, such that the sum thereof becomes 100. More particularly, the powders that have the molar ratios described in the following Table 3 were prepared.

TABLE 3

| NO | Powder name | Molar ratio |
|---|---|---|
| 1 | Barium carbonate | 19.69(1 − y') |
| 2 | Strontium carbonate | 19.69y' |
| 3 | Zinc oxide | 19.69 |
| 4 | Iron oxide | 53.61(1 − x) |
| 5 | Aluminum oxide | 53.61x |
| 6 | Sodium oxide | 7.01 |

In addition, x is selected as 0.12 in the range of $0<x\leq0.8$, and eleven y' is selected in the range of $0\leq y'\leq 1.0$, such that 11 were classified as described in the following Table 4.

TABLE 4

| NO | Example | y' |
|---|---|---|
| 1 | Example 1 | 0.4 |
| 2 | Example 2 | 0.45 |
| 3 | Example 3 | 0.5 |
| 4 | Example 4 | 0.55 |
| 5 | Example 5 | 0.6 |
| 6 | Example 6 | 0.65 |
| 7 | Example 7 | 0.65 |
| 8 | Example 8 | 0.75 |
| 9 | Example 9 | 0.8 |
| 10 | Example 10 | 0.85 |
| 11 | Example 11 | 0.9 |

Next, after the powders were put into the platinum crucible and the platinum crucible into a furnace, heat treating was performed ten times. In addition, after the powders were first slowly cooled at about 1° C./h, they were second slowly cooled at about 50° C./h. The heat treating condition and slow cooling condition are described in the following Table 5.

TABLE 5

| NO | Heat treating condition | | | Slow cooling condition | |
|---|---|---|---|---|---|
| First | room temperature →1200° C./h→ | | 1420° C. (20 hours maintenance) | →1200° C./h→ | 1100° C. |
| Second | →1200° C./h→ | | 1395° C. (1 hour maintenance) | →1200° C./h→ | 1120° C. |
| Third | →1200° C./h→ | | 1370° C. (1 hour maintenance) | →1200° C./h→ | 1140° C. |

TABLE 5-continued

| NO | Heat treating condition | | Slow cooling condition | |
|---|---|---|---|---|
| Fourth | 1200° C./h → | 1340° C. (1 hour maintenance) | 1200° C./h → | 1160° C. |
| Fifth | 1200° C./h → | 1320° C. (1 hour maintenance) | 1200° C./h → | 1180° C. |
| Sixth | 1200° C./h → | 1295° C. (1 hour maintenance) | 1200° C./h → | 1185° C. |
| Seventh | 1200° C./h → | 1270° C. (1 hour maintenance) | 1200° C./h → | 1185° C. |
| eighth | 1200° C./h → | 1245° C. (1 hour maintenance) | 1200° C./h → | 1185° C. |
| Ninth | 1200° C./h → | 1220° C. (1 hour maintenance) | 1200° C./h → | 1185° C. |
| Tenth | 1200° C./h → | 1195° C. (1 hour maintenance) | 1200° C./h → | 1185° C. |
| Slow cooling | 1° C./h → | 1100° C. | 50° C./h → | room temperature |

In the following Table 6, the formulas of 11 final hexaferrite samples that are finally obtained through the above processes are shown.

TABLE 6

| NO | Sample | y' | Y | Final hexaferrite |
|---|---|---|---|---|
| 1 | Sample 1 | 0.4 | 0.237 | $(Ba_{0.763}Sr_{0.237})_2Zn_2(Fe_{0.88}Al_{0.12})_{12}O_{22}$ |
| 2 | Sample 2 | 0.45 | 0.279 | $(Ba_{0.721}Sr_{0.279})_2Zn_2(Fe_{0.88}Al_{0.12})_{12}O_{22}$ |
| 3 | Sample 3 | 0.5 | 0.316 | $(Ba_{0.684}Sr_{0.316})_2Zn_2(Fe_{0.88}Al_{0.12})_{12}O_{22}$ |
| 4 | Sample 4 | 0.55 | 0.358 | $(Ba_{0.642}Sr_{0.358})_2Zn_2(Fe_{0.88}Al_{0.12})_{12}O_{22}$ |
| 5 | Sample 5 | 0.6 | 0.405 | $(Ba_{0.595}Sr_{0.405})_2Zn_2(Fe_{0.88}Al_{0.12})_{12}O_{22}$ |
| 6 | Sample 6 | 0.65 | 0.468 | $(Ba_{0.532}Sr_{0.468})_2Zn_2(Fe_{0.88}Al_{0.12})_{12}O_{22}$ |
| 7 | Sample 7 | 0.7 | 0.526 | $(Ba_{0.474}Sr_{0.526})_2Zn_2(Fe_{0.88}Al_{0.12})_{12}O_{22}$ |
| 8 | Sample 8 | 0.75 | 0.584 | $(Ba_{0.416}Sr_{0.584})_2Zn_2(Fe_{0.88}Al_{0.12})_{12}O_{22}$ |
| 9 | Sample 9 | 0.8 | 0.675 | $(Ba_{0.325}Sr_{0.675})_2Zn_2(Fe_{0.88}Al_{0.12})_{12}O_{22}$ |
| 10 | Sample 10 | 0.85 | 0.747 | $(Ba_{0.253}Sr_{0.747})_2Zn_2(Fe_{0.88}Al_{0.12})_{12}O_{22}$ |
| 11 | Sample 11 | 0.9 | 0.832 | $(Ba_{0.168}Sr_{0.832})_2Zn_2(Fe_{0.88}Al_{0.12})_{12}O_{22}$ |

As described in Table 6, it can be seen that all of the 11 hexaferrite samples that are finally obtained through the above test have Formula 5.

Figure 7:
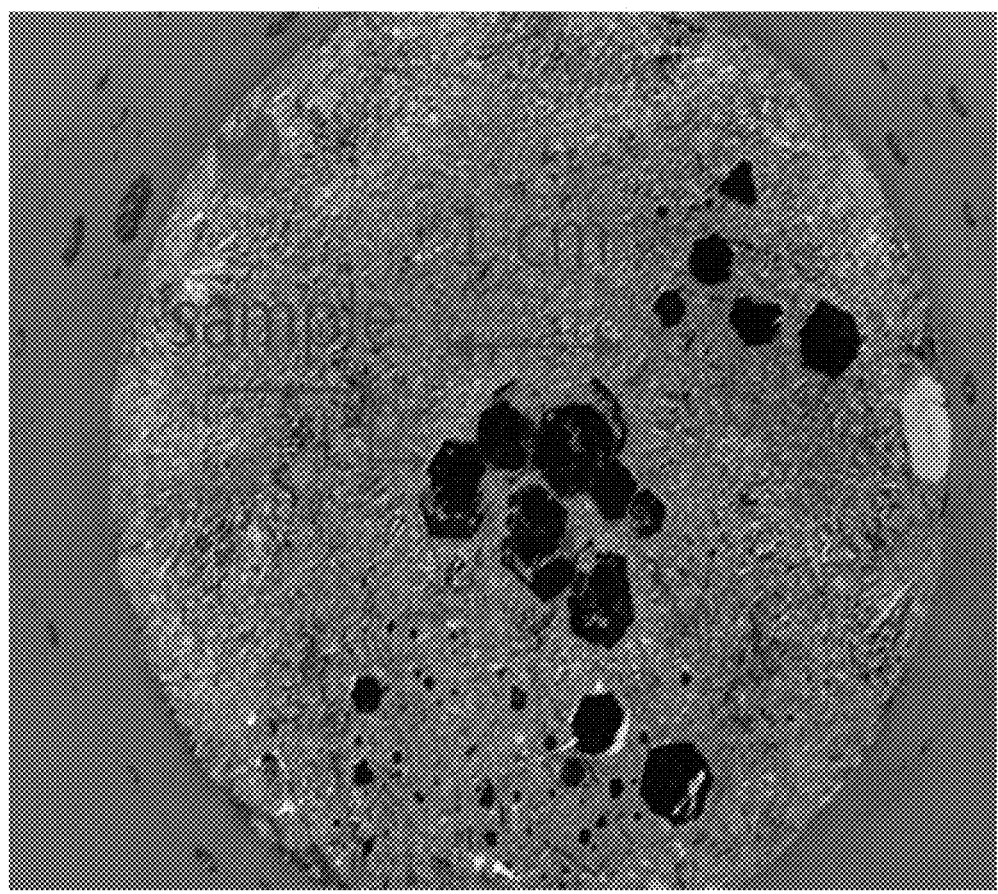
FIG. 7 is a picture of hexaferrite that is obtained from the manufacturing experiment of the multiferroic material.

FIG. 7 is a picture of hexaferrite that is obtained from the manufacturing experiment of the above multiferroic material. That is, it is the picture of the hexaferrite according to the first exemplary embodiment of the present invention.

As shown in FIG. 7, the hexaferrite has the hexagonal plate crystal structure. In addition, the hexaferrite that has the rhombohedral crystal structure was obtained.

Multiferroic Material According to the Second Exemplary Embodiment of the Present Invention The multiferroic material according to the second exemplary embodiment of the present invention is heat treated and its electrical resistivity increases. Therefore, i) the ferroelectric property that is caused by the occurrence of electric polarization when the magnetic field is applied and ii) the change of dielectric constant which are generated in the multiferroic material may be newly shown.

More particularly, in a case where a small magnetic field of about 0.1 T or less is applied at room temperature, the change of dielectric constant in the multiferroic material may be about 0% to about 20%. For example, in the multiferroic material, the change of dielectric constant in the range of about 0.1% to about 20% may occur. In addition, electric polarization of the multiferroic material may be induced through the application of a small magnetic field of about 0.1 T or less at room temperature. The above properties may be variously applied to the field of electronic material.

Herein, hexaferrite belong to a Y type of single crystal, and has the formula of $A_2B_2Fe_{12}O_{22}$. The A element may be one or more of barium (Ba) and strontium (Sr), and B element is any one of zinc, cobalt and magnesium. For example, hexaferrite may have the following Formula 6.

$$(Ba_{1-x}Sr_x)_2Zn_2Fe_{12}O_{22} (0 \leq x \leq 1.0)$$ [Formula 6]

Test Relating to Heat Treating Maintaining Time

The Y type hexaferrite single crystal that has the formula of $Ba_{0.5}Sr_{1.5}Zn_2Fe_{12}O_{22}$ was manufactured. Next, the single crystal was heated at a rate of about 220° C./h from about 25° C. to about 900° C. In addition, the samples were manufactured by setting the time that was maintained about 900° C. as about 2 days, about 8 days and about 14 days. Next, after the samples were cooled at a relatively low rate of about 50° C./h to about 25° C., resistivity was measured. In order to compare this, after the samples that were stored for about 2 days, about 8 days and about 14 days at room temperature without heat treatment were manufactured, the resistivity as a function of temperature was measured.

Figure 8:
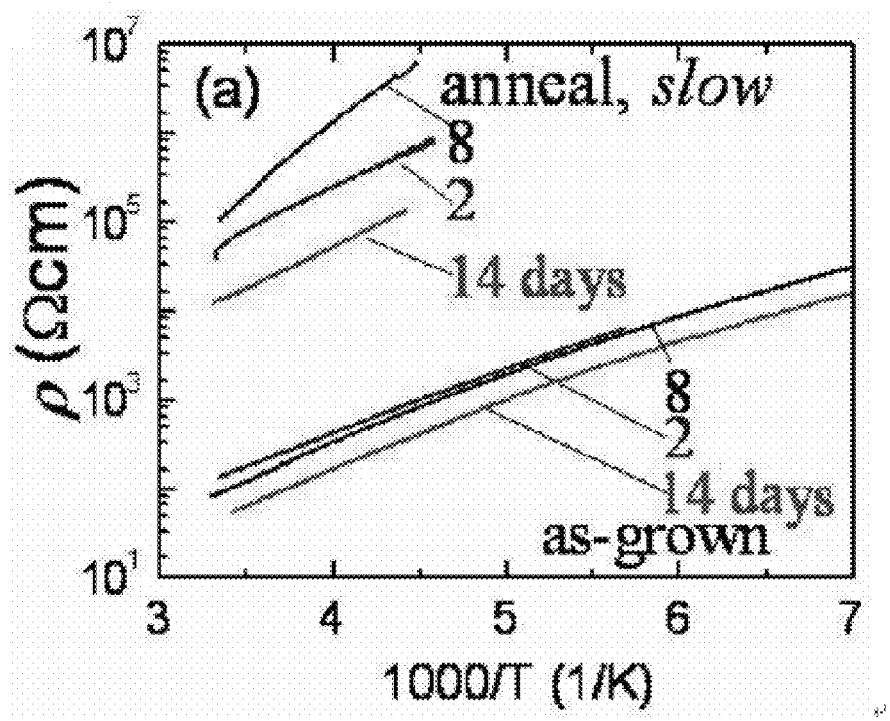
FIG. 8 is a graph that illustrates the test results of high temperature maintaining time effect after the heat treatment of the multiferroic material according to the second exemplary embodiment of the present invention.

FIG. 8 is a graph that illustrates test results of heat treatment maintaining of the multiferroic material according to the second exemplary embodiment of the present invention.

As shown in FIG. 8, it can be seen that regardless of the heat treatment, the resistivity of the sample is increased as it approaches room temperature after the temperature is decreased in the heat treatment process. In addition, it can be seen that the resistivity of the sample that was heat treated for about 2 days to about 14 days was larger than the resistivity of the sample that was not heat treated. In particular, the resistivity of the sample that was heat treated for 8 days was very high.

Cooling Rate Test

The Y type hexaferrite single crystal that has the formula of $Ba_{0.5}Sr_{1.5}Zn_2Fe_{12}O_{22}$ was manufactured. Next, the crystal was heated at a rate of about 220° C./h from about 25° C. to about 900° C. In addition, the hexaferrite was maintained for about 8 days at 900° C. Next, after the samples that were cooled to about 25° C. were manufactured for about 50° C./h (slow), about 95° C./h (intermediate) and about 300° C./h (quenching), the resistivity of the samples according to the temperature change were measured.

Figure 9:
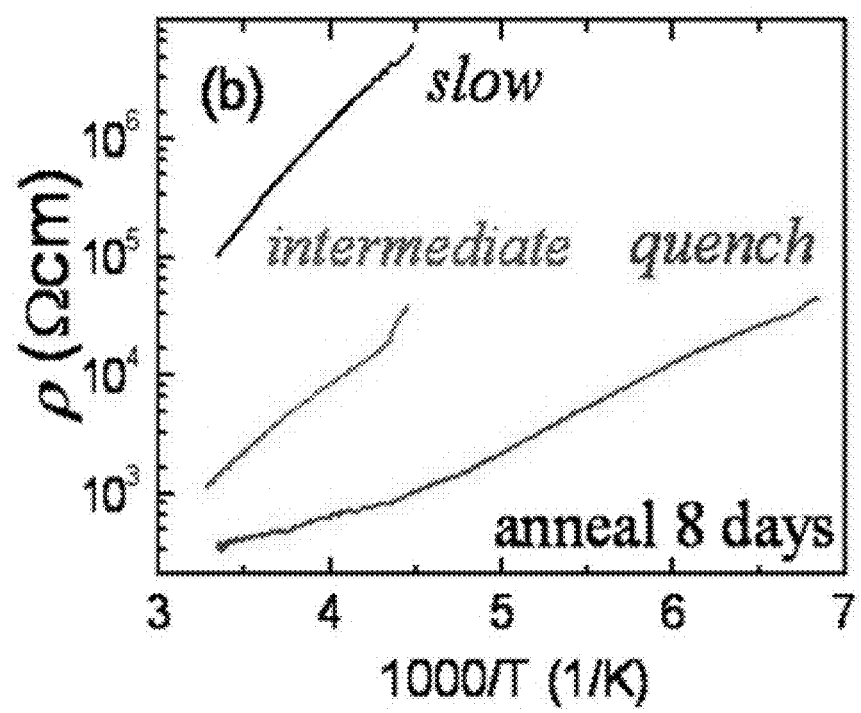
FIG. 9 is a graph that illustrates the test results of the cooling rates of samples.

FIG. 9 is a graph that illustrates test results of cooling rates of samples.

As shown in FIG. 9, in a case where the cooling rate of the sample was fast, the resistivity of the sample was relatively low and the resistivity of the sample was increased in the order of the cooling rate of about 95° C./h and about 50° C./h.

Dielectric Constant Change Test

The Y type hexaferrite single crystal that has the formula of $Ba_{0.5}Sr_{1.5}Zn_2Fe_{12}O_{22}$ was manufactured. Next, hexaferrite was heated at a rate of about 220° C./h from about 25° C. to about 900° C. In addition, the hexaferrite was maintained for 8 days at about 900° C. Next, the samples that were cooled from about 50° C. to about 25° C. were manufactured. In addition, while the temperature of the sample was set to about 10 K, about 90 K, about 160 K, about 220 K, about 260 K, about 270 K, about 280 K, about 290 K, about 300 K, about 310 K and about 315 K, the dielectric constant change of the sample by an applied magnetic field was measured.

Figure 10:
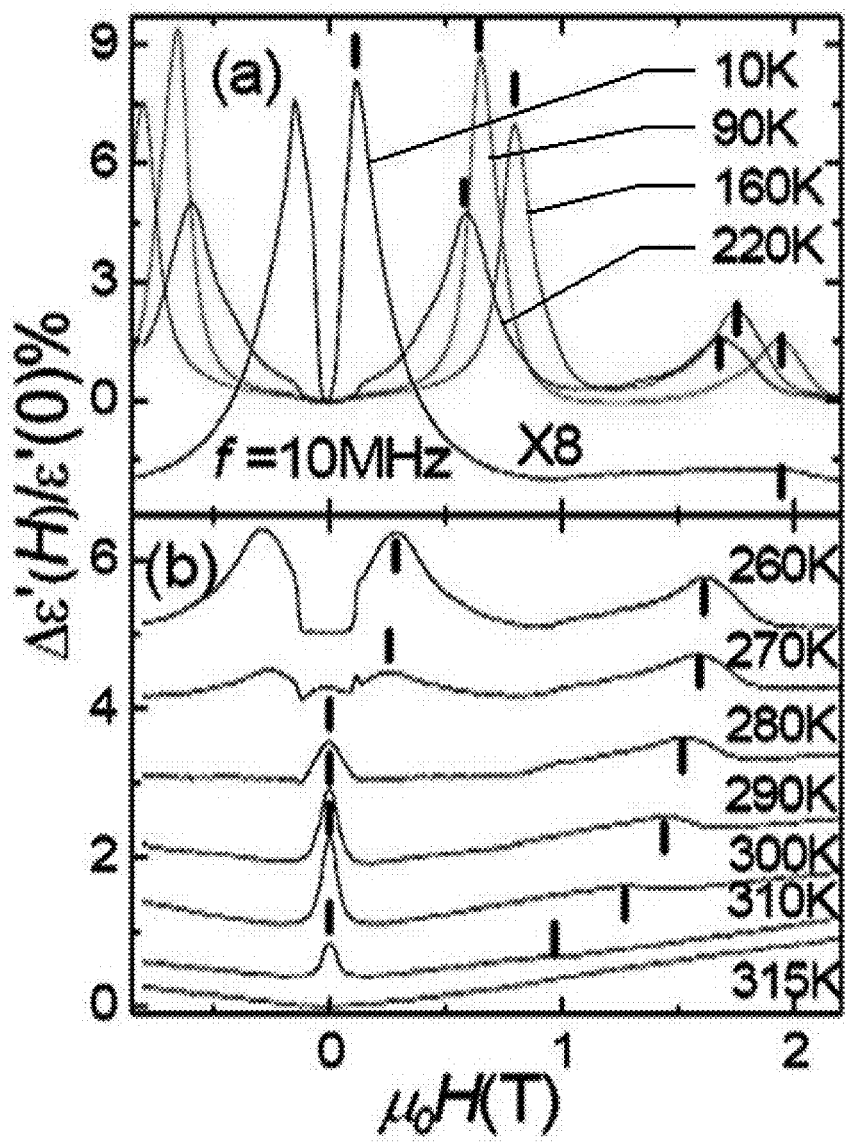
FIG. 10 is a graph that illustrates the test results of the dielectric constant change in samples.

FIG. 10 is a graph that illustrates test results of the dielectric constant changes of samples by an applied magnetic field. In detail, about 10 K, about 90 K, about 160 K and about 220 K were shown in portion a of FIG. 10, and about 260 K, about 270 K, about 280 K, about 290 K, about 300 K, about 310 K and about 315 K were shown in portion b of FIG. 10.

As shown in FIG. 10, at the temperature of about 260 K and above, as the temperature is increased, the magnetic field where dielectric constant shows peak appears approaches 0. At around room temperature, the dielectric constant of the sample may be changed by a low magnetic field of around 0. More particularly, at the temperature in the range of about 260 K to about 400 K, which includes room temperature, the dielectric constant of the sample may be changed by about 0.1% to about 20% by the low magnetic field of about 0.1 T. In addition, since the change of dielectric constant is caused by the change of the electric polarization, the electric polarization of the sample also appears by a low magnetic field of around 0 at around room temperature. Then the sample shows ferroelectricity.

Ferroelectric Region Test

The Y type hexaferrite single crystal that has the formula of $Ba_{0.5}Sr_{1.5}Zn_2Fe_{12}O_{22}$ was manufactured. Next, hexaferrite was heated at a rate of about 220° C./h from about 25° C. to about 900° C. and maintained for 8 days at about 900° C. Next, the samples were cooled to about 25° C. at a rate of about 50° C./h. Contrary to this, the sample that was not heat treated as the Y type hexaferrite single crystal that had the formula of $Ba_{0.5}Sr_{1.5}Zn_2Fe_{12}O_{22}$ was prepared. Next, the ferroelectric phase boundaries of the two samples at selected temperatures were determined from peak features in dielectric constant under applied magnetic fields.

Figure 11:
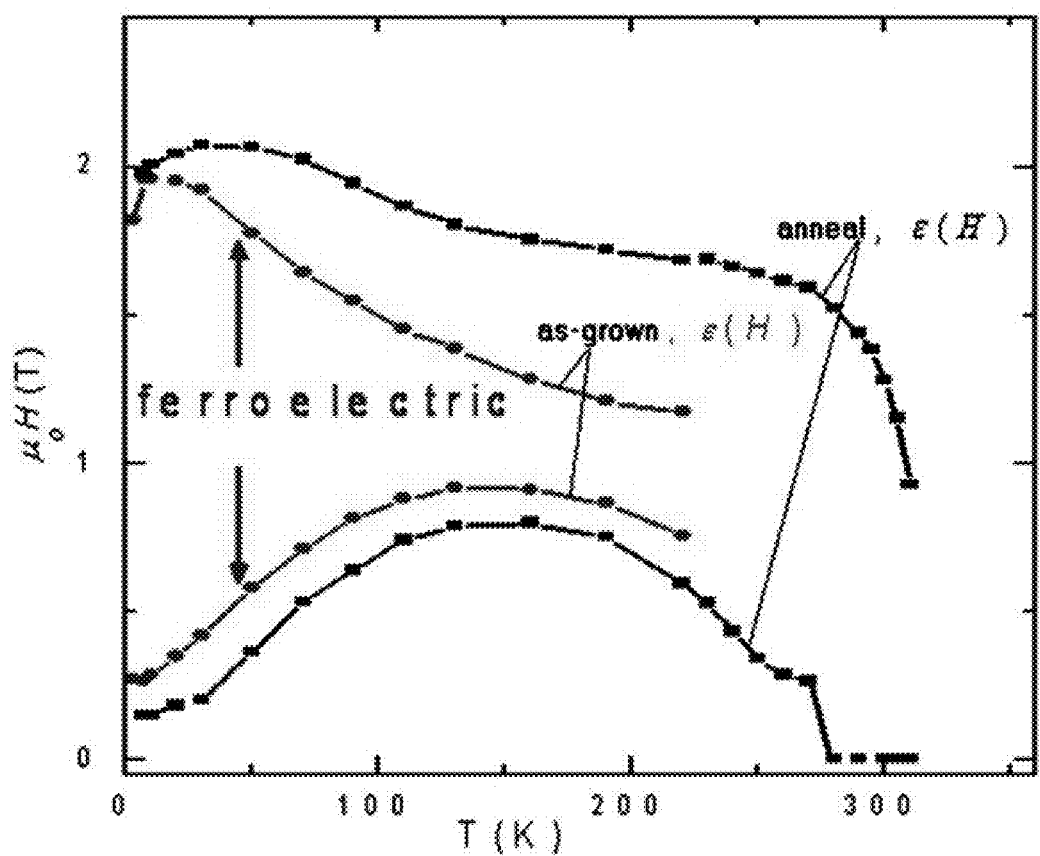
FIG. 11 is a graph that illustrates the test results of the ferroelectric region of the multiferroic material according to the second exemplary embodiment of the present invention.

FIG. 11 is a graph that illustrates test results of the ferroelectric region of the multiferroic material according to the second exemplary embodiment of the present invention.

As shown in FIG. 11, in the sample that was not heat treated, the ferroelectric region was not observed at room temperature. However, the sample that was heat treated, the region that had the ferroelectric polarization was observed at room temperature. More particularly, electric polarization that forms the ferroelectric region occurs in the heat treated sample at a temperature range of about 260 K to about 400 K, which includes room temperature, in a low magnetic field of about 0.1 T or less.

Figure 12:
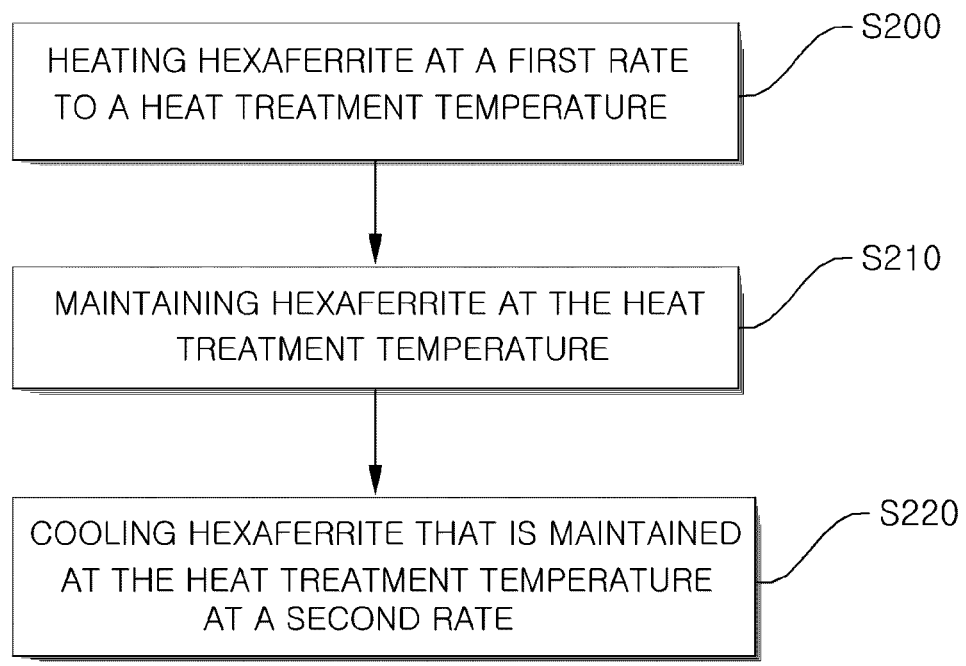
FIG. 12 is a flowchart that schematically illustrates a manufacturing method of the multiferroic material according to the second exemplary embodiment of the present invention.

Manufacturing Method of the Multiferroic Material According to the Second Exemplary Embodiment of the Present Invention FIG. 12 is a flowchart that schematically illustrates a manufacturing method of the multiferroic material according to the second exemplary embodiment of the present invention.

As shown in FIG. 12, the method for manufacturing a multiferroic material according to the second exemplary embodiment of the present invention includes i) heating the hexaferrite to the heat treatment temperature at a first rate (S200), ii) maintaining the hexaferrite at the heat treatment temperature (S210), and iii) cooling the hexaferrite that is maintained at the heat treatment temperature at a second rate (S220). In addition to this, the manufacturing method of the multiferroic material may further include other steps.

The hexaferrite that is heated in step S200 of FIG. 12 is the Y type hexaferrite single crystal and has the formula of $A_2B_2Fe_{12}O_{22}$. An A element may be one or more of barium (Ba) and strontium (Sr), and a B element may be any one of zinc (Zn), cobalt (Co) and magnesium (Mg). Herein, the A element, B element in conjunction with iron, aluminum and oxygen form a rhombohedral crystal structure. For example, hexaferrite has the following Formula 7.

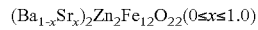

$$(Ba_{1-x}Sr_x)_2Zn_2Fe_{12}O_{22} (0 \leq x \leq 1.0)$$ [Formula 7]

Herein, the range of x that shows the content relationship between barium and strontium is $0 \leq x \leq 1.0$. This is because barium and strontium that construct a rhombohedral structure in conjunction with the other elements and cause the change in electric polarization and dielectric constant by the applied magnetic field can substitute with each other.

Hexaferrite may be manufactured by the manufacturing method of the multiferroic material according to the first exemplary embodiment of the present invention.

As shown in FIG. 12, in step S200, the hexaferrite is heated at the first rate to the heat treatment temperature. The multiferroic material that has relatively high resistivity is manufactured by removing i) attacks by sodium impurity, ii) oxygen deficiency, and iii) a factor relating to a low gamma (γ) value through heat treatment, which are factors that lower the resistivity of the hexaferrite. Hereinafter, the gamma (γ) value will be described in more detail through FIG. 13.

Figure 13:
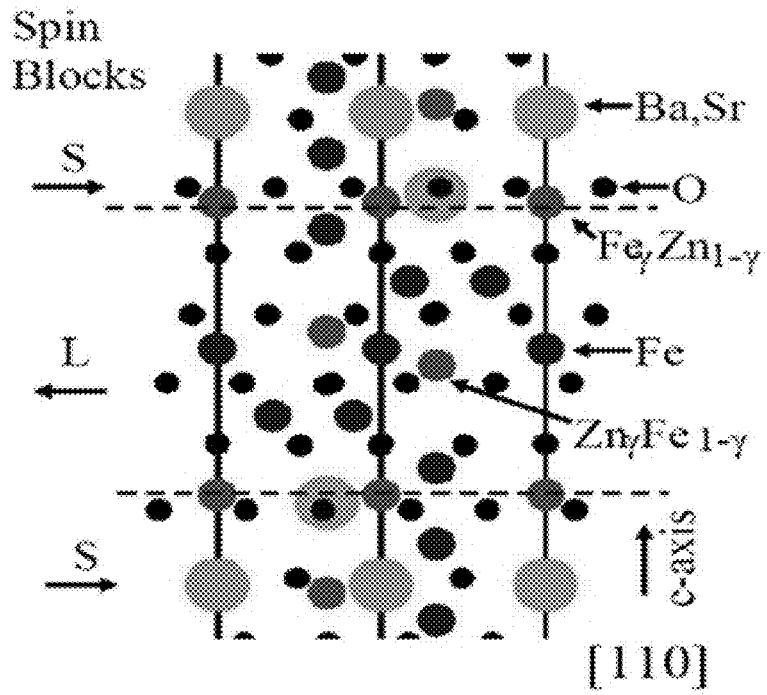
FIG. 13 is a schematic view that describes the gamma (γ) value.

FIG. 13 is a schematic view that describes the gamma (γ) value. FIG. 13 illustrates a crystal structure in [110] direction of the multiferroic material that has the formula of $Ba_{0.5}Sr_{1.5}Zn_2Fe_{12}O_{22}$.

As shown in FIG. 13, the gamma (γ) value is classified for the 12 layers of the Y type hexaferrite structure that has the formula of $Ba_{0.5}Sr_{1.5}Zn_2Fe_{12}O_{22}$. The gamma (γ) value corresponds to a probability in which zinc may mix with iron at the site of the 11th layer. If the probability of γ in the 11th layer is determined, the Fe site is substituted with the Zn ion in a probability of (1−γ) in the site of the 4th layer. The ideal gamma (γ) value may be about 0.5, but in reality, the value may be different according to the manufacturing method of the material. Therefore, controlling the gamma (γ) value is very important in determining its physical properties. Iron and zinc are irregularly dispersed into the tetrahedral site, and L and S are spin blocks that have two tetrahedral sites.

More particularly, in a case where sodium attacks hexaferrite, the resistivity of hexaferrite is lowered due to the factors such as i) an electron hole carriers that is provided by sodium, ii) a change in crystal structure, and iii) a decrease in oxygen that reacts with iron and is caused by sodium oxide. In addition, in a case where oxygen deficiency occurs, the resistivity of hexaferrite is lowered due to factors such as instability of the crystal structure. In addition, in a case where the gamma (γ) value is low, activation energy (Δ) that is shown "$\rho(T) = \rho_n \exp(\Delta/T)$" at about 300 K is lowered and the resistivity of hexaferrite is lowered.

Therefore, in order to remove the factors lowering the resistivity, the multiferroic material is heat treated under the oxygen atmosphere. Oxygen deficiency is removed by heat treating the multiferroic material under the oxygen atmosphere. Zinc is well dispersed by thermal energy, and the gamma (γ) value is increased, and the resistivity of the multiferroic material is increased. However, in a case when the multiferroic material is heat treated, the attack from the sodium will affect the crystal adversely upon heat treatment. It is necessary to precisely control the heat treatment condition.

In a case where the resistivity of hexaferrite is increased by precisely controlling the heat treating condition, the insulator property of the multiferroic material becomes much better. As a result, the occurrence of ferroelectric polarization and the dielectric constant change by the occurrence of electric polarization may be exhibited when the magnetic field is applied to the multiferroic material. The above properties may be variously applied to the field of electronic material field. Hereinafter, through FIG. 14, each step S200, S201, and S220 of FIG. 12 will be described in more detail.

Figure 14:
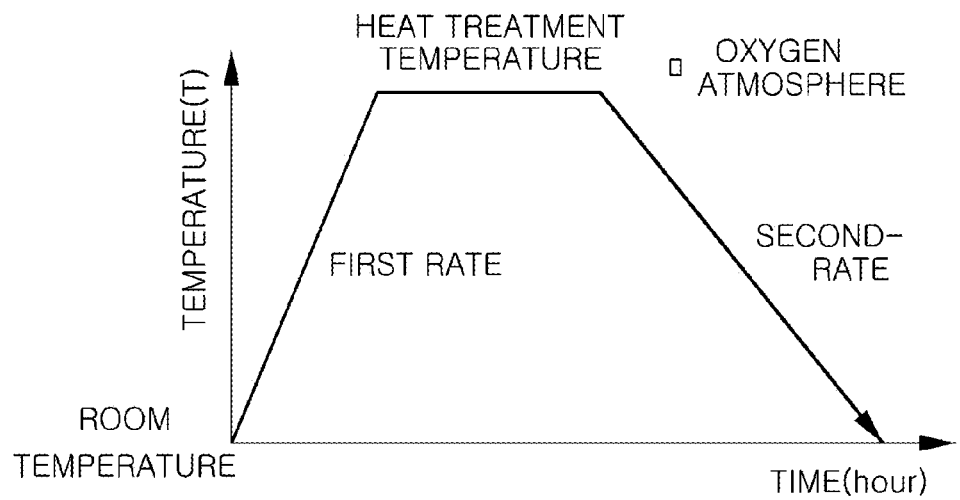
FIG. 14 is a graph that schematically illustrates a manufacturing method of hexaferrite according to the second exemplary embodiment of the present invention.

FIG. 14 is a graph that schematically illustrates a manufacturing method of the hexaferrite according to the second exemplary embodiment of the present invention.

As shown in FIG. 14, in order to remove oxygen deficiency, hexaferrite may be heat treated under an oxygen atmosphere. Herein, in a case where the oxygen pressure is less than about 0.5 atm, the removal efficiency of oxygen deficiency is significantly lowered. On the other hand, in a case where the oxygen pressure is more than about 500 atm, it is difficult to control the oxygen deficiency. Therefore, the oxygen pressure may be in the range of 0.5 to 500 atm. For example, the oxygen pressure may be about 1 atm. Under the oxygen atmosphere, the hexaferrite is heated at the first rate to the heat treating temperature.

Before heating, hexaferrite may be kept at room temperature range of about 260 K to about 400 K. However, the temperature of hexaferrite is not limited thereto, but is enough as long as hexaferrite is maintained in a solid state. For example, before heating, the temperature of the hexaferrite may be about 298 K, that is, 25° C.

In a case where the first rate is less than about 10° C./h, since the time that is required in heating is lengthened, the manufacturing yield is lowered. In addition, since the oxygen permeation to hexaferrite becomes small, the removal efficiency of oxygen deficiency may be lowered. On the other hand, in a case where the first rate is more than about 1500° C./h, which may break the heating wire of the electric furnace that is used for the heat treatment. Therefore, the first rate may be in the range of about 10° C./h to about 1500° C./h. For example, the first rate may be substantially 220° C./h.

In a case where the heat treatment temperature is less than about 800° C., since the temperature is relatively low, zinc is not well dispersed. Therefore, the gamma value is not increased and the oxygen deficiency is not removed. On the other hand, in a case where the heat treating temperature is more than about 950° C., the crystal structure of hexaferrite may be partially melted. Therefore, the heat treating temperature may be about 800° C. to about 950° C. For example, the heat treating temperature may be substantially 900° C.

Referring to FIG. 12 again, in step S210, the hexaferrite is maintained at the heat treatment temperature. In a case where the period for maintaining hexaferrite at the heat treatment temperature is less than about 2 days, oxygen deficiency is not sufficiently removed. In addition, since zinc is not sufficiently dispersed, the enhancement of resistivity in the multiferroic material is lowered. On the other hand, in a case where the maintaining period is more than about 14 days, oxygen deficiency is removed and zinc is dispersed, but since sodium attack is increased, the effect of increase of resistivity is lowered. Therefore, the maintaining time may be about 2 days to about 14 days. For example, the maintaining period may be substantially about 8 days.

Referring to FIG. 12 and FIG. 14, in step S220, the multiferroic material is manufactured by cooling hexaferrite that is maintained at the heat treatment temperature in the second rate. In a case where the second rate is less than about 10° C./h, since the time that is required in cooling process is lengthened, the manufacturing yield is lowered. In addition, the resistivity at room temperature of hexaferrite that is finally obtained is lowered by 100 times. On the other hand, in a case where the second rate is more than about 100° C./h, since the cooling time is relatively short, rearrangement of the crystal structure is not well implemented. Therefore, the finally obtained multiferroic material has a relatively small resistivity at room temperature. Therefore, the second rate may be in the range of about 10° C./h to about 100° C./h. For example, the second rate may be substantially 50° C./h.

As described above, the first rate and second rate may be selected in the range of about 10° C./h to about 1500° C./h and about 10° C./h to about 100° C./h, respectively. Herein, the first rate may be larger than the second rate. This is because the manufacturing yield can be improved by making the first rate as fast as possible, and the crystal structure can be stably rearranged by making the second rate as slow as possible. For example, the first rate and the second rate may be substantially about 220° C./h and about 50° C./h, respectively.

The temperature of the multiferroic material that is finally obtained by cooling may be at the temperature range of about 260 K to about 400 K. However, it is not limited thereto but is enough as long as the multiferroic material can be maintained in a solid phase. For example, the temperature of the multiferroic material that is finally obtained by cooling process may be about 298 K, that is, 25° C.

The resistivity of the hexaferrite that is obtained after step S220 is in the range of $10^4$ Ω·cm to $10^7$ Ω·cm. Meanwhile, the resistivity of hexaferrite that is obtained before step S200, that is, hexaferrite that is crystallized and obtained after step S120 of FIG. 5 is 10 Ω·cm to $10^3$ Ω·cm. Therefore, the ratio of the resistivity of the hexaferrite that is obtained after step S220 to resistivity of the hexaferrite that is obtained after step S120 may be in the range of 10 to $10^6$. As described above, the resistivity of hexaferrite is largely increased by the heat treatment. Since the resistivity of hexaferrite can be increased through the heat treatment, the dielectric constant of hexaferrite can be changed by a low magnetic field. Meanwhile, in a case where the resistivity of hexaferrite that is obtained after step S220 is too low, since the electric polarization is screened by electrons, it is difficult to use its ferroelectric properties. That is, as the resistivity is increased, it is easy to use its ferroelectric properties. On the other hand, the resistivity of hexaferrite that is obtained after step S220 may not be too high because of a technical limit.

While the present invention has been described in connection with what is presently considered to be practical exemplary embodiments, it is to be understood by those who are skilled in the art that the invention is not limited to the disclosed embodiments, but, on the contrary, is intended to cover various modifications and equivalent arrangements included within the spirit and scope of the appended claims.

The invention claimed is:

1. A method for manufacturing a multiferroic material, the method comprising:
providing powders that selectively include barium carbonate powder, strontium carbonate powder, zinc oxide powder, iron oxide powder, aluminum oxide powder and sodium oxide powder;

heat treating the powders one or more times; and
slowly cooling the heat-treated powders to provide hexaferrite,
wherein slowly cooling the heat-treated powders includes:
performing a first cooling process at around 0.1° C./h to around 10° C./h; and
performing a second cooling process at around 50° C./h to around 100° C./h.

2. The method according to claim 1, wherein a molar ratio of the barium carbonate powder, strontium carbonate powder, zinc oxide powder, iron oxide powder, aluminum oxide powder, and sodium oxide powder is $A_1(1-y')$, $A_1y'$, $A_2$, $A_3(1-x)$, $A_3x$ and $A_4$,
wherein $A_1$, $A_2$, $A_3$ and $A_4$ are selected so that the sum of $A_1$, $A_2$, $A_3$ and $A_4$ is 100 within ranges of $17 \leq A_1 \leq 22$, $17 \leq A_2 \leq 22$, $48 \leq A_3 \leq 59$ and $6 \leq A_4 \leq 8$, and
wherein y' and x are selected from ranges of $0 \leq y' \leq 1.0$ and $0 < x \leq 0.8$.

3. The method according to claim 1, wherein the heat treating of the powders includes:
heating the powders up to a first temperature;
maintaining the powders at the first temperature; and
cooling the powders from the first temperature to a second temperature that is lower than the first temperature.

4. The method according to claim 3, wherein the first temperature is selected in a range of around 1100° C. to around 1500° C., and the second temperature is selected in a range of around 1000° C. to around 1200° C.

5. The method according to claim 3, wherein in the heating of the powders, a temperature increase rate is in a range of around 900° C./h to around 1500° C./h.

6. The method according to claim 3, wherein in the cooling of the powders during the heat treating of the powders, a temperature decrease rate is in a range of around 900° C./h to around 1500° C./h.

7. The method according to claim 3, wherein the heat treating is performed two or more times, the first temperature is decreased or maintained as equal to that of a previous time whenever the heat treating is performed, and the second temperature is increased or maintained as equal to that of the previous time whenever the heat treating is performed.

8. The method according to claim 3, wherein the heat treating is performed two or more times, the maintaining is performed for around 10 to around 30 hours at a first time of performing the heat treating, and the maintaining is performed for 0 to around 5 hours from a second time of performing the heat treating.

9. The method according to claim 1, further comprising:
heating the hexaferrite up to a heat treatment temperature at a first rate,
maintaining the hexaferrite at the heat treatment temperature, and
cooling the hexaferrite, which has been maintained at the heat treatment temperature, at a second rate.

10. The method according to claim 9, wherein in the heating of the hexaferrite, the first rate is in a range of around 10° C./h to around 1500° C./h.

11. The method according to claim 10, wherein the first rate is around 220° C./h.

12. The method according to claim 9, wherein in the heating of the hexaferrite, the heat treatment temperature is in a range of around 800 to around 950° C.

13. The method according to claim 12, wherein the heat treatment temperature is around 900° C.

14. The method according to claim 9, wherein in the cooling of the hexaferrite, the second rate is in a range of around 10° C./h to around 100° C./h.

15. The method according to claim 14, wherein the second rate is around 50° C./h.

16. The method according to claim 9, wherein the heating, the maintaining, and the cooling processes are implemented under an oxygen atmosphere.

17. The method according to claim 16, wherein an oxygen pressure under the oxygen atmosphere is in a range of around 0.5 atm. to around 500 atm.

18. The method according to claim 17, wherein the oxygen pressure is around 1 atm.

19. The method according to claim 9, wherein the hexaferrite has a Y type, and includes $A_2B_2(Fe_{1-x}Al_x)_{12}O_{22}$ ($0 \leq x \leq 0.8$), an A element being one or more of barium (Ba) and strontium (Sr), a B element being zinc (Zn).

20. The method according to claim 19, wherein the hexaferrite includes $(Ba_{1-y}Sr_y)_2Zn_2(Fe_{1-x}Al_x)_{12}O_{22}$ ($0 \leq y \leq 1.0$, $0 \leq x \leq 0.8$).

21. The method according to claim 9, wherein a ratio of resistivity of the hexaferrite, which is obtained after cooling the hexaferrite, to resistivity of the hexaferrite, which is obtained after providing the hexaferrite, is in a range of around 10 to around $10^6$.

22. The method according to claim 21, wherein the resistivity of the hexaferrite, which is obtained after cooling the hexaferrite is in a range of around $10^4$ Ω·cm to around $10^7$ Ω·cm.

23. The method according to claim 9, wherein a change in a dielectric constant of the hexaferrite, which is obtained after cooling the hexaferrite, is in a range of 0 to around 20% at a temperature in a range of around 260 K to around 400 K and in a magnetic field in a range of 0 to around 0.1 T.

24. The method for according to claim 9, wherein an electric polarization of the hexaferrite after cooling the hexaferrite occurs at a temperature in a range of around 260 K to around 400 K and in a magnetic field in a range of 0 to around 0.1 T.

25. A multiferroic material comprising:
a hexaferrite in which magnetic iron ions are partially substituted by nonmagnetic ions to change a magnetic anisotropic property of the hexaferrite,
wherein the hexaferrite has a Y type and includes $A_2B_2(Fe_{1-x}Al_x)_{12}O_{22}$ ($0 < x \leq 0.8$), and
wherein an A element is at least one of barium (Ba) and strontium (Sr), and a B element is any one of zinc (Zn), cobalt (Co), and magnesium (Mg).

26. The multiferroic material according to claim 25, wherein a substitution ratio of the nonmagnetic ions to the magnetic iron ions is greater than zero and less than 80%.

27. The multiferroic material according to claim 25, wherein an electric polarization of hexaferrite occurs in a magnetic field in a range of 0 to around 10 mT.

28. The multiferroic material according to claim 25, wherein as a substitution amount of the nonmagnetic ions is increased, a magnitude of a magnetic field that causes an electric polarization of the hexaferrite approaches 0.

29. The multiferroic material according to claim 25, wherein a change in a dielectric constant of the hexaferrite is in a range of 0 to around 20% in a magnetic field that is in a range of 0 to around 10 mT.

30. The multiferroic material according to claim 25, wherein as a substitution amount of the nonmagnetic ions is increased, a magnitude of a magnetic field that causes a change in a dielectric constant of the hexaferrite approaches 0.

31. The multiferroic material according to claim 25, wherein the hexaferrite includes $(Ba_{1-y}Sr_y)_2Zn_2(Fe_{1-x}Al_x)_{12}O_{22}$ ($0 \leq y \leq 1.0$, $0 < x \leq 0.8$).

32. The multiferroic material according to claim 25, wherein the resistivity of the hexaferrite is in a range of around $10^4$ Ω·cm to around $10^7$ Ω·cm.

33. The method according to claim 1, wherein the hexaferrite is crystallized hexaferrite.

34. The multiferroic material according to claim 25, wherein the hexaferrite has a heliconical spin ordering.

* * * * *